(12) United States Patent
Kooken et al.

(10) Patent No.: US 6,268,587 B1
(45) Date of Patent: Jul. 31, 2001

(54) CURRENT FEEDBACK DEVICE FOR ELECTRIC ARC WELDER

(75) Inventors: Todd Eric Kooken, University Hts.; Lifeng Luo, Solon, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/507,642

(22) Filed: Feb. 22, 2000

(51) Int. Cl.$^7$ .......................................................... B23K 9/10
(52) U.S. Cl. ................................ 219/130.32; 219/137.05; 363/25
(58) Field of Search .......................... 219/130.32, 130.33, 219/137 PS; 363/25

(56) References Cited

U.S. PATENT DOCUMENTS

| | | | |
|---|---|---|---|
| 4,564,742 | * | 1/1986 | Karlsson ........................... 219/130.33 |
| 5,349,157 | * | 9/1994 | Blankenship ....................... 219/130.32 |
| 5,351,175 | | 9/1994 | Blankenship . |
| 5,601,741 | | 2/1997 | Thommes . |
| 6,111,216 | * | 8/2000 | Stava ............................... 219/137 PS |

* cited by examiner

*Primary Examiner*—Clifford C. Shaw
(74) *Attorney, Agent, or Firm*—Vickers, Daniels & Young

(57) ABSTRACT

In an electric arc welder including a main transformer with a primary stage coupled to a secondary stage in which is created an AC output current, a first switch opened and closed at a given rate to pass a series of first pulses of DC current in a first circuit having a first lead and through at least a portion of the primary stage in a first electrical direction, with each of the first pulses having a length determined by the time the first switch is closed, a second switch opened and closed at the given rate to pass a series of second pulses of DC current in a second circuit having a second lead through at a least a portion of the primary stage in a second electrical direction with each of the second pulses having a length determined by the time the second switch is closed, and a control circuit for rapidly closing the first and second switches in sequence to induce an AC current in the output stage, the improvement comprising: a first current transformer surrounding the first lead of the first circuit to develop a first output signal controlled by the first pulses, a second current transformer surrounding the second lead of the second circuit and developing a second output signal controlled by the second pulses and a circuit for combining the first and second output signals to provide a current signal indicative of the total current in the primary stage of the main transformer.

39 Claims, 7 Drawing Sheets

CURRENT FEEDBACK DEVICE FOR ELECTRIC ARC WELDER

The present invention relates to the art of electric arc welding and more particularly to a rapid switching type inverter power supply for electric arc welding with an improved current feedback device for use in such welder.

INCORPORATION BY REFERENCE

The present invention relates to an electric arc welder having a rapid switching inverter type power supply including an output transformer with a primary stage and a secondary stage. In the preferred embodiment of the invention, the primary stage includes two separate primary windings through which are passed current pulses of opposite polarity determined by closing a set of switches causing the current flow through separate portions of the input stage. Such an electric arc welder is disclosed in Blankenship 5,351,175 incorporated by reference herein as background information. Such electric arc welder normally includes a shunt in the output welding circuit for sensing the arc current as a voltage level used as a feedback signal for controlling the current directed to the secondary stage of the output transformer. Details of this type of electric arc welder and arrangements for rapidly switching the input DC current to provide positive and negative current pulses are well known power supply technology and need not be repeated as background to the present invention.

BACKGROUND OF INVENTION

An inverter welder for electric arc welding normally includes a rapid switching inverter including a transformer having a primary stage magnetically coupled with the secondary stage that creates an AC or pulsating current. The AC output current is rectified and used in the electric arc welding process. The primary stage of the transformer is a winding which is subject to a series of positive polarity current pulses alternating with a series of negative polarity current pulses. In some inverters, the primary winding is divided into two sections, one receiving the positive polarity pulses and the other receiving the negative polarity pulses so that the secondary stage, or secondary winding, outputs an AC current. This AC current is rectified and filtered to produce a DC welding current. Rapidly created series of positive current pulses and negative current pulses are caused by closing a switch in a series circuit with an input DC link. The switching rate is normally about 20 kHz; however, other super audio frequencies are used. The "switch" may include two or more switches in series so that the switch for the positive polarity pulses and the switch for the negative polarity pulses operate in sequence to create the AC primary current. In this type of power supply for an arc welder, the arc current is sensed at the welding operation and is used as a feedback signal to control the length of time the two switches are closed to control the output welding current at a set current. Such control systems also involve an inner loop for sensing the current in the primary stage of the output transformer to create another feedback parameter which is combined with the arc current to control the two switches driving the primary stage of the transformer. The outer loop current feedback is normally sensed by a shunt in the output circuit. A shunt reads the actual current being used in the welding operation to give an accurate current feedback signal. The inner control loop presents more challenges. The current used in the primary stage of the output transformer must be determined in a real time manner. In the inverter, a shunt can not be used because the pulsating current has a very high frequency and relatively high power. Such factors cause heating of the shunt, as well as causing inaccuracy in the high frequency response of a shunt. Another drawback of a shunt is that it provides no electrical insulation. Consequently, the inner loop feedback control for current in a rapid switching inverter has heretofore used a current transformer responsive to high frequency pulses and capable of handling high current power signals. A current transformer in the primary stage has been suggested due to its high frequency response, high power capability and the ability to isolate the sensed current signal form the input stage of the inverter. The use of a current transformer in certain applications has not been completely successful in obtaining the inner loop component of a current mode control system. As long as the AC current being sensed by the current transformer is symmetrical, there is no net DC component and the current transformer provides a satisfactory feedback signal for the inner loop of the welder. However, if the AC current being measured becomes asymmetrical or unbalanced for any reason, the current transformer tends to saturate and distort the signal. The signal is distorted by adding a DC shift that is proportional to the DC component in the main transformer. This shift is caused by the current transformer's inability to produce an output with a DC component. By adding this DC component the "area" of the positive pulse equals the "area" of the negative pulse and the current transformer's flux is forced to be balanced by resetting itself during the switch off-time. The current signal in the inverter can become asymmetrical when the main transformer to the inverter is pushed into saturation or when the pulses to the main transformer are not equal for each half cycle. In order to prevent an asymmetrical signal from saturating the current transformer used to measure the primary current in the inverter, it is common practice to employ a DC blocking capacitor in combination with the current transformer. The DC blocking capacitor is either used in series with the primary or secondary of the current transformer. Although such a DC blocking capacitor in the secondary of the current transformer will prevent the secondary from causing the transformer to saturate, such capacitor will not prevent an asymmetric primary current from causing a distorted output signal. Consequently, a current transformer in the primary stage of the main transformer to sense the current through the transformer coil often experiences imbalanced current pulses. The positive polarity pulses are different from the negative polarity pulses. The blocking capacitor in the current transformer will eliminate the DC component by shifting the current transformer output signal. Consequently, the current transformer will shift the current pulses to balance the DC component. When the current transformer signal shifts, the current mode control will regulate the pulse width based upon a distorted signal. The control system will continue creating current pulses having different widths which continues the unbalanced process. This unbalance is initially quite small; however, the difference continues to increase causing the output signal of the current transformer to shift further to compensate for the current unbalance. Consequently, the current imbalance or unbalance will continue to increase until the main transformer is pushed into saturation. Running the transformer in saturation causes the switch elements to heat up by being subjected to high currents. Also, a saturated main transformer will reduce the ability to deliver power to the secondary output.

THE INVENTION

In accordance with the present invention, two current transformers are placed in the primary circuit of the main transformer of an inverter used in an electric arc welder. Each current transformer is used to measure either the positive polarity pulses or the negative polarity pulses. When using the two current transformers in a push pull inverter, half bridge inverter or full bridge inverter, each of the current transformers encircles a lead in the pulsing circuits so that each current transformer senses the pulses of a given polarity. The location of the current transformers is chosen so that the current flowing through each of the current transformers is unidirectional. The output signals of the two unidirectional current transformers can be combined with a blocking diode for each current transformer to give a signal that is representative of the total current flow in the primary stage of the output transformer. By using this arrangement, each current transformer can be provided with a parallel resistor before the blocking diode. This resistor causes rapid resetting of the transformer after each pulse has been directed to the summing output or load resistor. Consequently, the combined signal from the two transformers is not shifted by the DC component of the main primary current. The signals from the two current transformers are combined to provide a feedback control signal representative of the actual or total current in the primary stage. In the inverter topography or architecture so far described, only one current transformer is conducting at a time so the output signals from the two separately energized current transformers can be combined either by addition or subtraction. The least complex combining circuit is a circuit which adds the output signals from the two separate current transformers. The output signals from the two current transformers are added to give a signal that is equivalent to the total current flow in the primary stage. The summing circuit or combining circuit for the signals from the current transformers includes a load resistor. Current from each of the current transformers will make a series diode forward conducting and is passed through the load resistor. The voltage across this resistor is the sum of the current signals from both current transformers. As soon as the forward current flow from the current transformer stops, the core is rapidly reset by a circuit including the series diode that becomes reverse biased. The diode prevents reverse flow back through the low impedance load resistor and forces a high reverse voltage across the current transformer with the parallel reset resistor to rapidly reset the core. The core is exposed only to the high resistance reset resistor and not to the low resistance output or load resistor. The reset resistor is sized to reset the core in a minimum time with the only practical limitation being the voltage across the reset resistor can not exceed the voltage rating on the blocking diode used to isolate the core from the output or load resistor. The ability of the core in the current transformer to reset after each pulse is obtainable by using the present invention involving two separate current transformers, each of which is exposed to a lead carrying current pulses of a given polarity. Prior attempts to use a single AC type current transformer, exposed the transformer to the low impedance or load resistor during both on and off periods of the switch. This forces resetting of the one transformer core by the DC capacitor after each pulse through the load resistor. Therefore, the amount of resetting current is reflected to the current feedback signal and causes the "shifting" of unbalanced pulse signal. In certain topographies for inverters used in electric arc welding, such as shown in Blankenship 5,351,175 incorporated by reference herein, the currents to be sensed are flowing in both current transformers simultaneously. Consequently, it is preferred that the sensed output signals from the two separate current transformers are subtracted from each other. By subtracting the sensed signals the output current signal is equivalent to the signal from a single AC current transformer subjected to both currents. When two forward converters are magnetically coupled, as in the Blankenship inverter, the output signals from the two separate and distinct current transformers, in accordance with an aspect of the invention, are subtracted. This process removes from the current transformer signals the circulating currents. Circulating current is the current passed between primary windings that does not contribute to secondary current. The operation of a combining circuit that subtracts is generally similar in operation to the combining circuit which adds the two transformer signals. A subtracting circuit combines the two signals so the voltage developed across the load resistor is proportional to the difference of the two sensed currents. Consequently, a subtracting circuit is used for an inverter that has two forward converters with coupled output windings. In such an inverter topography, current flow through the primary winding of one current transformer causes a circulating current to flow through the primary winding of the other current transformer. To allow the circuit to operate with largely unsymmetrical pulse another aspect of the invention is used where a zener diode is connected in series with the circuits creating the signals from the transformer before the currents are subtracted. These diodes prevent voltage in the combining circuit from causing current flow in the current transformer not being driven by a current pulse. These concepts allow accurate inner loop current sensing for controlling the output current of the inverter. By using two separate and distinct current transformers having signals which are combined either by addition or subtraction, it is possible to sense fault conditions that cannot be detected by a single current transformer. When there is a shorted switch one of the sensed currents increases drastically. Such increase activates a disabling command to prevent damage to other components. Thus, when using two separate current transformers it is also possible to incorporate an overcurrent network to detect when one or more of the switch sets is defective. This system provides the ability to sense high circulating currents caused by a shorted transistor or capacitor. When this fault condition is detected, the inverter can be turned off to prevent further damage to the power supply.

In accordance with the present invention there is provided a current feedback device for creating a current signal indicative of the total current in the primary stage of the main transformer of a switching type inverter. The transformer has a primary stage coupled to a secondary stage and receives a positive pulsing current flowing in a first lead and a negative pulsing current flowing in the second lead. The novel feedback device comprises a first current transformer surrounding the first lead to develop a first output signal controlled by the positive pulsing current, a second current transformer surrounding the second lead to develop a second output signal controlled by the negative pulsing current and a circuit for combining the first and second output signals to provide a current signal indicative of the current in the primary stage of the main transformer. In this current feedback device, the current signal is referred to as the "inner loop" current signal. Such signal is used in welders by being combined with the "output loop" current signal to control operating the switches of the inverter to control the welding current.

In accordance with another aspect of the present invention, the inverter using the current feedback device includes two forward converters one for the positive pulses and one for the negative pulses. A current transformer is associated with each separate converter for sensing the positive pulses and the negative pulses directed to the primary winding of the output transformer. Since the portions of the primary winding used by the two forward converters is a different winding of the same core, a pulse in one winding causes a circulating pulse in the other winding. For that reason, when a power pulse is detected as one of the two current transformers, a circulating current pulse is induced, through mutual coupling, and is detected by the other current transformer. Such circulating currents are unwanted for the "inner loop" current feedback. In one aspect of the invention the circulating currents are removed from the current transformer output signal.

The primary object of the present invention is the provision of a current sensing device for a rapid switching inverter, which device uses a separate current transformer for the positive pulses and the negative pulses of the two circuits driving the main transformer to sense the DC component of the two primary windings.

A further object of the present invention is the provision of a current sensing device, as defined above, which device includes a resistor and diode for each current transformer for resetting the cores of each transformer after detection of a current pulse and before receipt of the next pulse.

Still a further object of the present invention is the provision of a current sensing device, as defined above, which current sensing device adds or subtracts the signal from the two separate current transformers to provide a current signal representative of the current flow in the primary stage of the output transformer of an inverter.

Yet another object of the present invention is the provision of a current sensing device, as defined above, which device includes a combining circuit which subtracts the two signals from the individual current transformers and also includes a zener diode in each of the circuits for the individual current transformers for preventing current flow caused by a reflected voltage.

Another object of the present invention is the provision of a current sensing device, as defined above, which current sensing device also includes a circuit capable of sensing the current flow in both a positive and negative pulse circuits of an inverter to detect overcurrents with high circulating components caused by faults in the inverter switching system.

Still a further object of the present invention is the provision of an electric arc welder including a main transformer with a primary stage coupled to the secondary stage in which is created an AC output current, which welder uses the current sensing device defined above to provide a current signal that can be combined with the arc current signal to control the operation of the welder.

Yet another object of the present invention is the provision of an improvement in an electric arc welder of the type including a main transformer with a primary stage coupled to a secondary stage in which is created an AC output current, which improvement is the use of two separate and distinct current transformers sensing the positive current pulses and the negative current pulses in the primary stage of the main transformer to create separate and distinct signals combined either by addition or subtraction to give a current signal representative of the current flow in the primary stage. This inner loop current signal is used with the outer loop current feedback signal to control and balance the positive and negative current pulses.

These and other objects and advantages will become apparent from the following description taken together with the accompanying drawings.

PREFERRED EMBODIMENTS OF THE INVENTION

Figure 1:
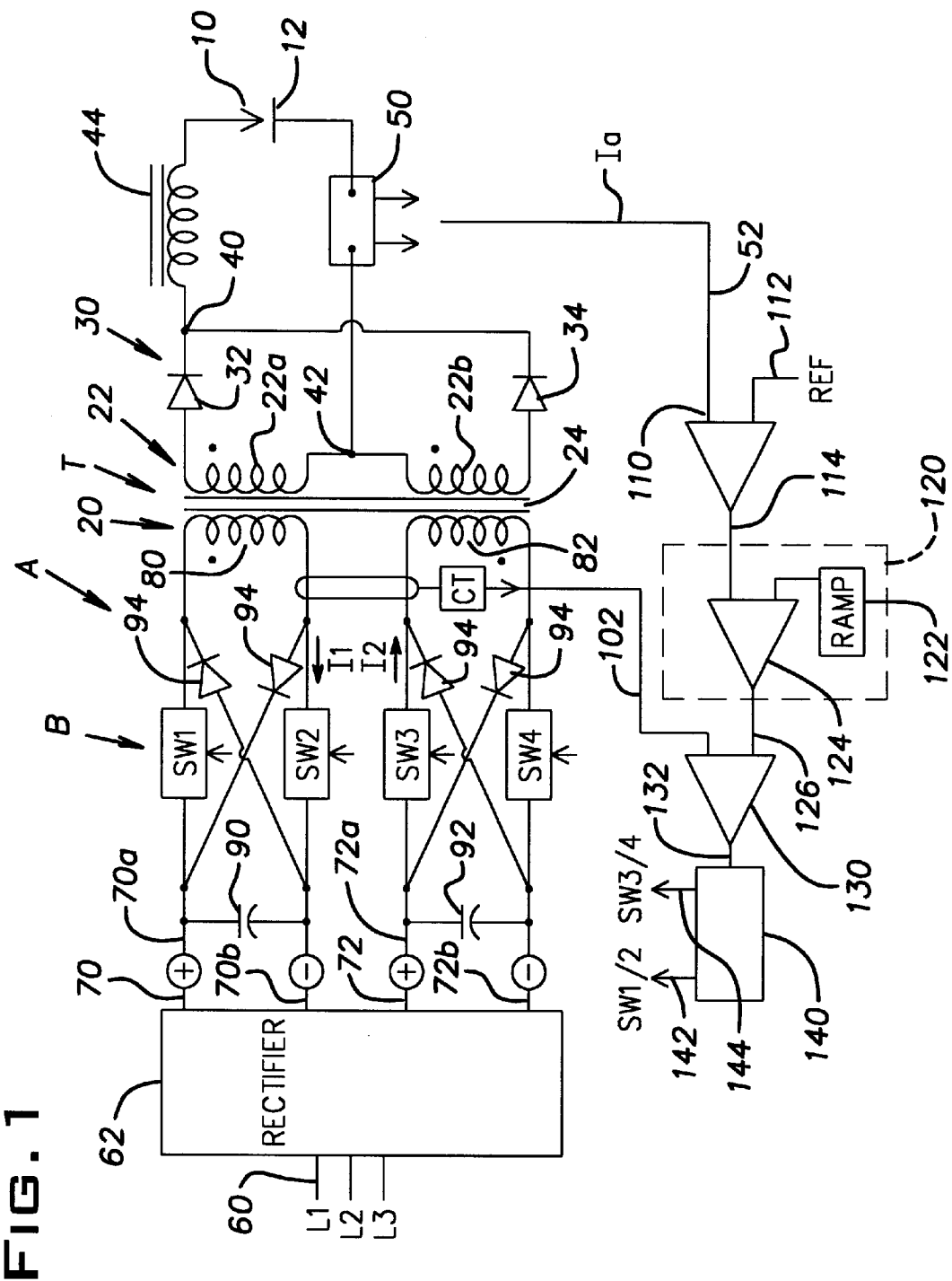
FIG. 1 is a wiring diagram showing an electric arc welder driven by a two stage inverter showing a single current transformer providing the current signal for the inner loop of the current mode control system.
Figure 2:
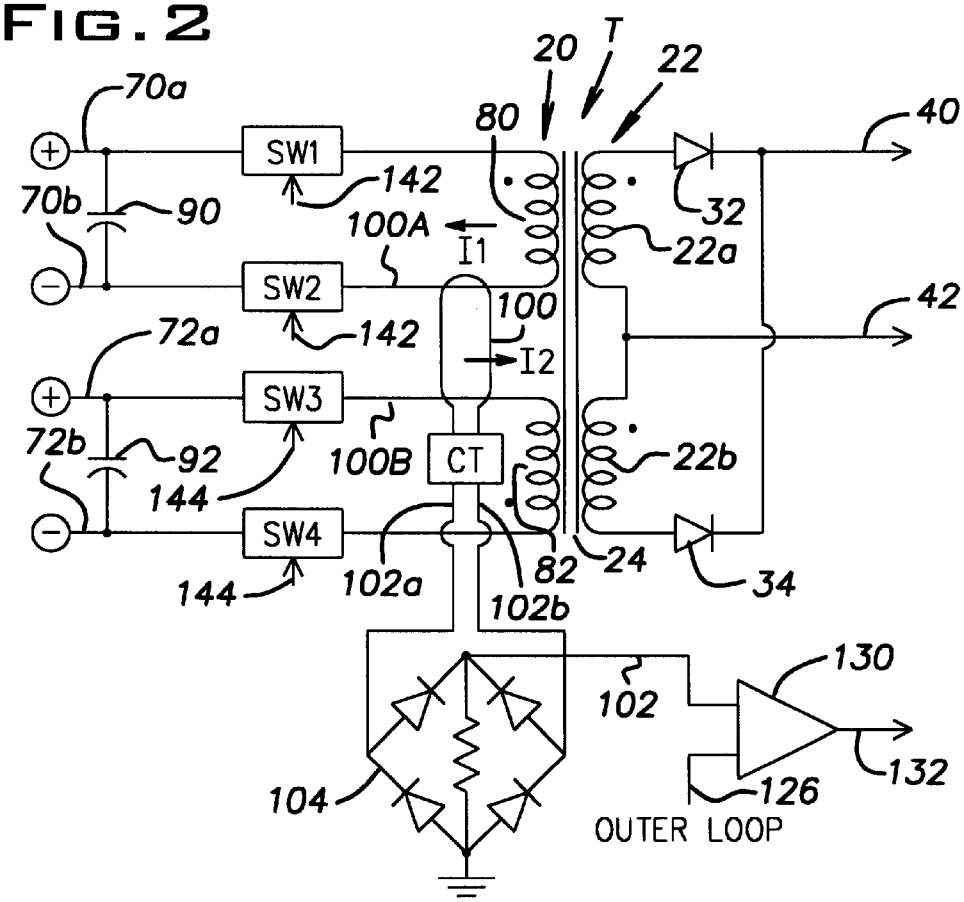
FIG. 2 is a wiring diagram, similar to FIG. 1, showing certain details of the output circuit for the single transformer.
Figure 3:
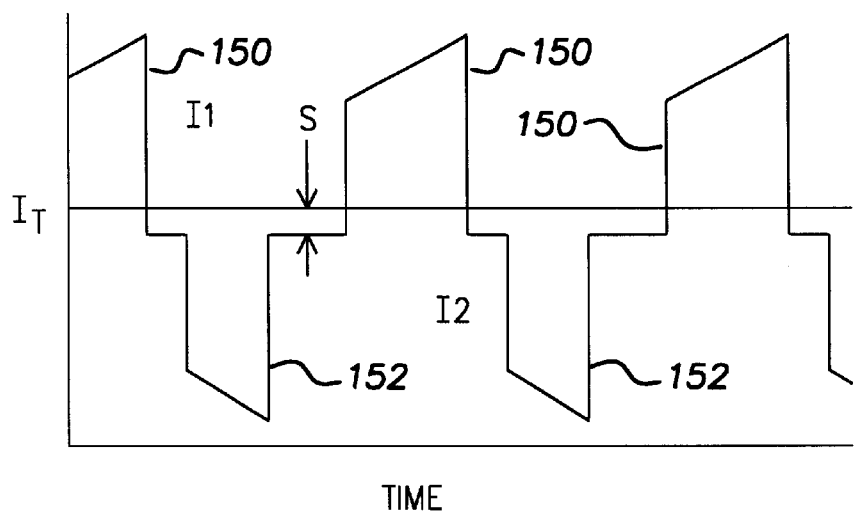
FIG. 3 is a pulse diagram of current pulses sensed by the current transformer, shown in FIGS. 1 and 2, with a shift to compensate for the DC component.
Figure 4:
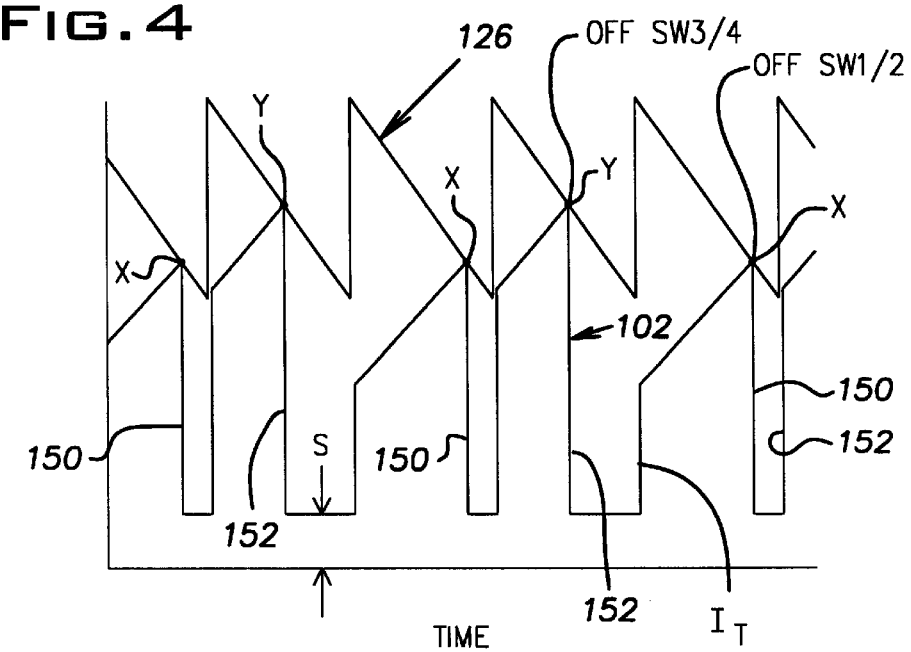
FIG. 4 is a current chart showing the interaction of the "inner loop" signal and the "output loop" signal for controlling the switches of the inverter illustrated in FIGS. 1 and 2.

Referring now to the drawings, wherein the showings are for the purpose of illustrating preferred embodiments of the invention only and not for purpose of limiting same, FIGS. 1 and 2 show an electric arc welder A for creating a welding current across electrode 10 and workpiece 12 in accordance with standard welding practice. Main transformer T includes a primary stage 20, a secondary stage 22 and a coupling core 24 whereby rapid switching inverter B generates an AC current in secondary stage 22. This AC current is rectified by rectifier 30 having diodes 32, 34, to create a positive terminal 40 and a negative terminal 42. As welding current $I_a$ passes between electrode 10 and workpiece 12, it is filtered by choke 44 and sensed by shunt 50 having an output signal in line 52 which is the arc current $I_a$ of the welding operation. Arc current $I_a$ is considered the "outer loop" signal of the current mode control. This feedback current is used for controlling the current from inverter B that drives transformer T to create the AC current in secondary stage 22 shown as secondary windings 22a, 22b. To provide the power for inverter B, there is provided a three phase input 60 directed to rectifier 62 which creates a first DC link 70 having leads 70a, 70b and a second DC link 72 having leads 72a, 72b. Primary stage 20 is formed from two separate primary windings or portions 80, 82 which windings alternately receive positive pulses and negative current pulses, respectively. Pulses are controlled by the conductive state of switches SW1, SW2 and switches SW3, SW4. Each of these switches which act as a single "switch" directs current pulses from DC link 70,72 to primary windings 80,82, respectively. While the switches SW1, SW2 are closed, a positive pulse is created in primary winding 80. In a like manner, when switches SW3, SW4 are closed, a negative pulse is applied to primary winding or portion 82. Windings 80, 82 are wound as indicated to create alternating positive and negative current pulses to create positive and negative current pulses in secondary windings 22a, 22b. The AC current is rectified by rectifier 30 to provide a DC current for the electric arc welding process. In accordance with standard practice, DC links 70, 72 are provided with capacitors 90, 92, respectively which are used with clamping diodes 94 to clamp the windings 80, 82 to the voltage across large input capacitors 90, 92. These clamping diodes are standard and are inserted to prevent voltage overshooting as the switches are opened. In operation, switches SW1, SW2 are closed in unison by a single trigger signal and are held closed for a time to determine the length of the positive pulses applied to transformer T. In a like manner, switches SW3, SW4 are closed in unison to provide a negative pulse to transformer T. By operating the switches in unison and alternately, an AC current is applied to the primary stage 20. Illustrated inverter B includes two forward converters that are magnetically coupled by core 24. The "outer loop" current signal for the current mode control is dictated by the sensed welding current $I_a$ in line 52. An "inner loop" current signal is generated by single current transformer CT having a primary 100 encircling lead 100A carrying current $I_1$ and lead 100B carrying current $I_2$. Currents $I_1$, $I_2$ are opposite in direction and constitute positive current pulses and negative current pulses. As the current pulses in lines 100A, 100B alternately flow, the combined AC current is detected by primary loop 100 to create an output in line 102 shown in FIG. 1 as a composite signal of |100A–100B|. A more precise illustration of the signal in line 102 is illustrated in FIG. 2 wherein lines 102a and 102b are read by bridge 104 to create output 102. Consequently, the "inner loop" current signal is the voltage on line 102 and the "outer loop" current signal is the voltage on line 52. To manipulate the outer loop current signal, error amplifier 110, having a reference level 112, receives the current signal on line 52 to create an output in line 114. This output is directed to a standard slope comparator 120 including an internal ramp generator 122 and an internal error amplifier 124 having an output 126 constituting the outer loop current signal. This signal is generated by slope comparator 120 in accordance with standard welding practice. The inner loop current signal on line 102 is compared with the outer loop current signal on line 126 by error amplifier 130 to create pulses in line 132 for controlling the switch driving circuit 140. Triggers or outputs 142, 144 alternately actuate switches SW1, SW2 and SW3, SW4 in accordance with the pulses on line 132. The use of a single current transformer CT for creating a feedback current signal controlled by the inner loop of the welder has presented certain difficulties. These difficulties are illustrated in FIG. 3 wherein an unbalance is illustrated. Positive pulses 150 of current $I_1$ are greater in width than negative pulses 152 of current $I_2$. The illustrated unbalance is exaggerated; however, current transformer CT shifts the negative current $I_2$ downwardly a distance S to balance the current flow in portions 80, 82. This shift attempts to remove the DC component caused by the imbalance of current in the negative and positive directions. Such shift removes the DC component but does not correct the imbalance. As illustrated in FIG. 4 sawtooth curve 126 is the output of amplifier 124. Pulses 150, 152 of FIG. 3 are rectified as shown in FIG. 4 to give an offset or shift S. This shift lengthens the discrepancy between time when switches SW1 and SW2 are closed and time when switches SW3, SW4 are closed. These switches are closed until opened at times x, y, respectively. Since the CT causes a shift S between the positive and negative pulses to create a balance between the positive and negative currents, the normal control system as shown in FIG. 1 continues to operate with a difference in lengths of the negative and positive current pulses. This difference in pulse lengths continues to increase until the saturation of the main transformer occurs. When the transformer saturates, the current ramps up faster than the signal shifts. At this point equilibrium is reached and the system will run with the main transformer pushed into saturation. As can be seen, the use of a single CT for sensing the current in the primary stage 20 of transformer T can result in unwanted saturation of the current transformer which leads to saturation of the input transformer. This disadvantage is overcome by the present invention, as best illustrated in FIG. 5.

Figure 5:
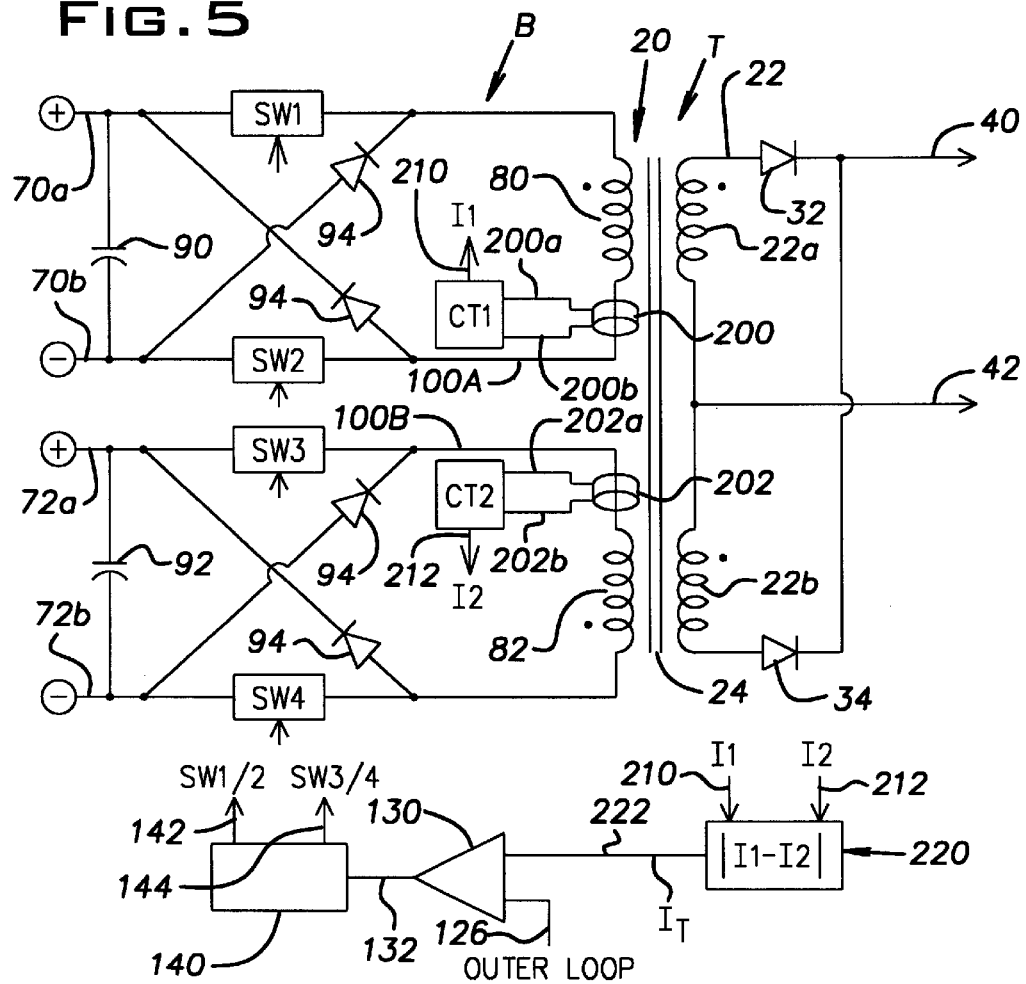
FIG. 5 is a wiring diagram of an inverter generally shown in FIG. 1 employing the preferred embodiment of the current feedback device of the present invention.
Figure 6:
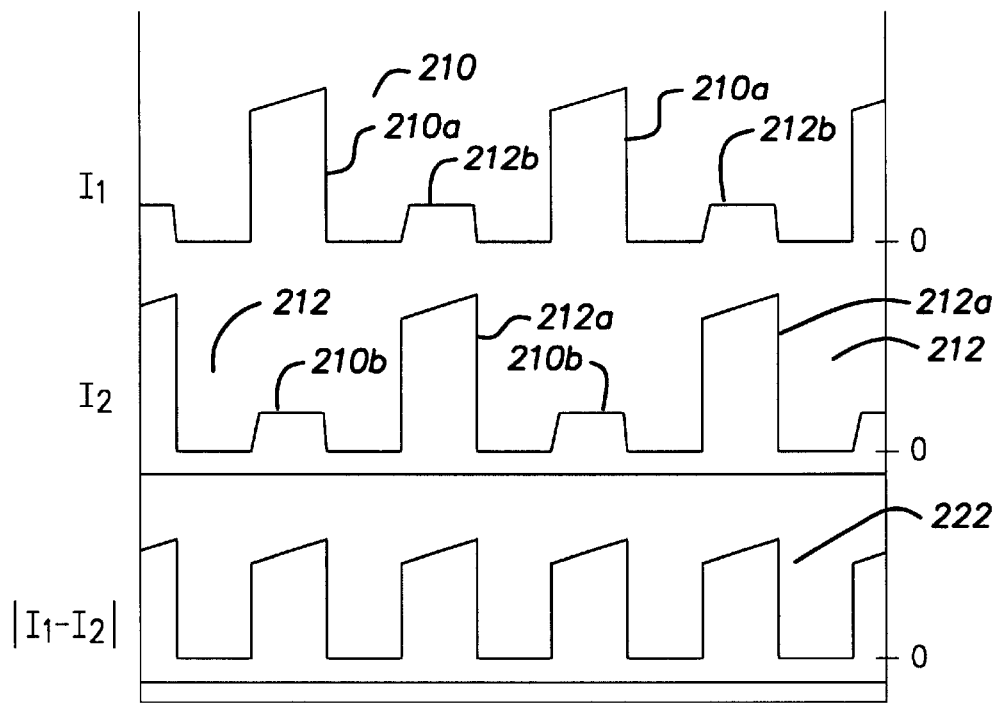
FIG. 6 is a chart showing a number of current graphs representing the output signals from the two current transformers used in FIG. 5 and the combination of these signals with a subtraction circuit.

In accordance with the present invention, current detect leads 100A, 100B are provided with two separate and distinct unidirectional current transformers $CT_1$ and $CT_2$ as shown in FIG. 5. The individual current transformers have primaries 200, 202 surrounding leads 100A, 100B, respectively. Primary terminals 200a, 200b detect current pulses in lead 100A to create a pulsating signal in line 210. This signal follows the pulses in current $I_1$. In a like manner, terminals 202a, 202b create a representation of current $I_2$ in line 212. The output lines 210, 212 are directed to a combining circuit illustrated as subtract circuit 220, best shown in FIG. 7. The output of subtract circuit 220 is the absolute difference between currents $I_1$, $I_2$ in output line 222. This is the current signal for the "inner loop" current signal and is used, as illustrated in FIG. 1, for one input to amplifier 130. Output 132 controls switch drive circuit 140 to produce coordinated trigger signals in output or gate lines 142, 144. In FIG. 6, current pulses constituting output signals on lines 210,212 are represented. When a positive pulse 210a is flowing in primary portion or winding 80, a corresponding circulating current pulse 210b flows in winding or portion 82. In a like manner, when negative current pulses 212a flows in primary winding or portion 82, a circulating current pulse 212b flows in primary winding 80. This circulating current is caused by the mutual coupling of windings 80, 82 by core 24. As shown in FIG. 6, by subtracting the current signals in lines 210, 212, circulating current pulses 210b, 212b are eliminated. Consequently, when there are circulating current pulses by using an inverter with mutually coupled primary windings, such as shown in FIGS. 1, 2 and 5, the subtract combining circuit 220 is preferred. This gives an absolute current difference in line 222 for the current signal from the "inner loop" to be combined with the current signal in line126 constituting the "outer loop" current signal. These two feedback signals control the output current of welder A. Consequently, the disadvantages associated with the DC current shift by the AC current transformer to compensate for differences in the current $I_1$ and current $I_2$ is overcome.

Figure 7:
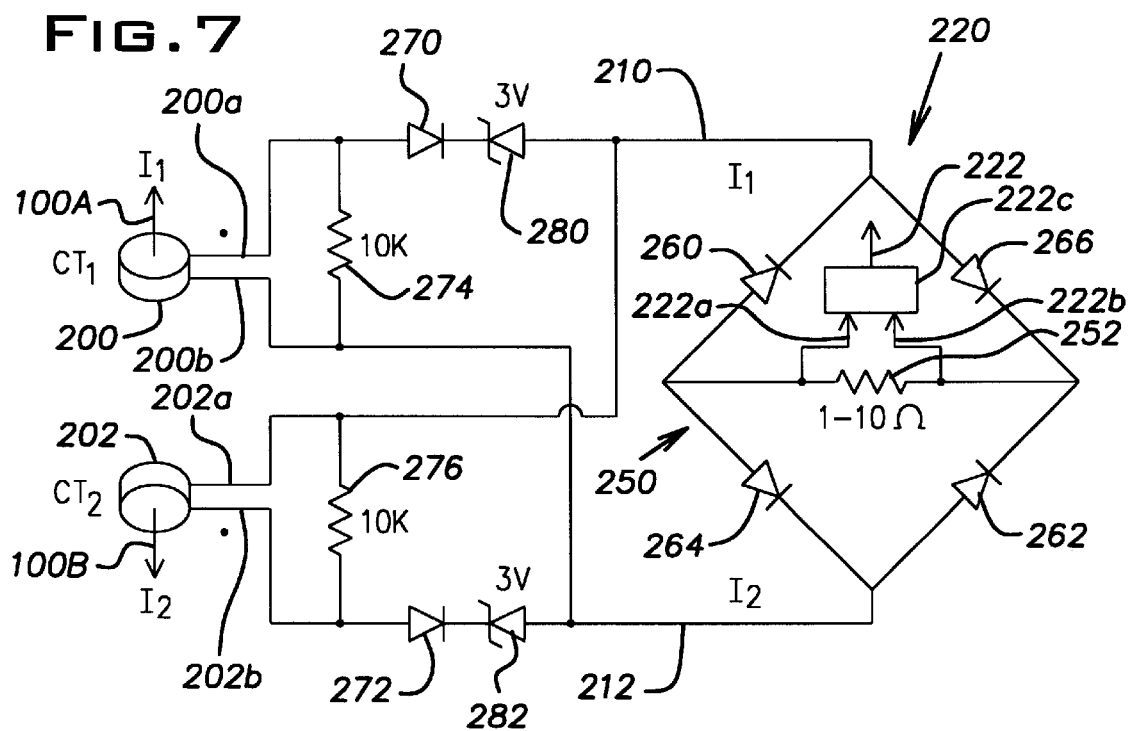
FIG. 7 is a subtract circuit to obtain the pulse signal illustrated in the lower graph of the chart shown in FIG. 6.
Figure 8:
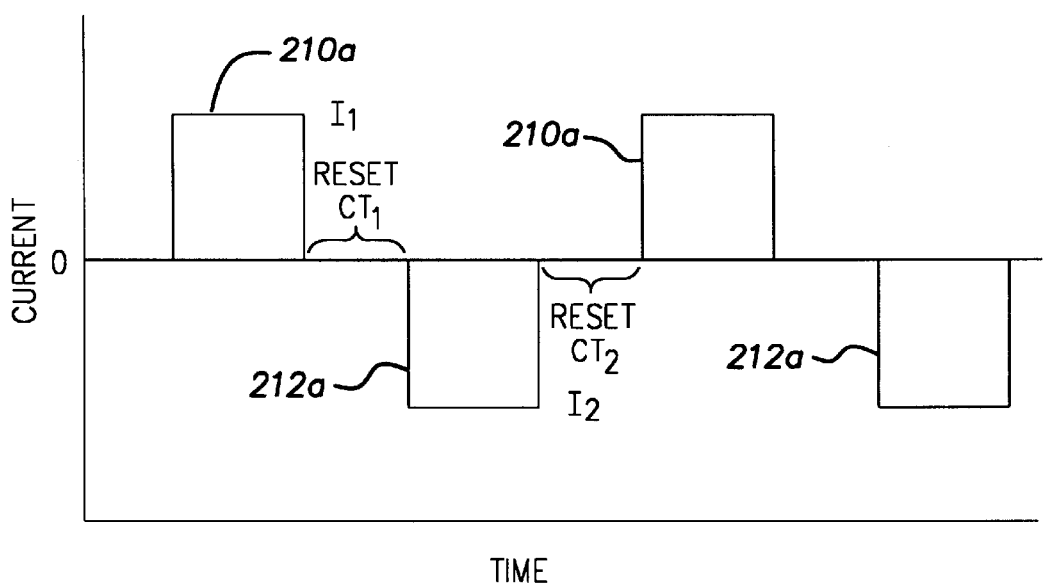
FIG. 8 is an AC current graph illustrating the reset characteristics of the subtract circuit shown in FIG. 7.

Subtract combining circuit 220 is shown in detail in FIG. 7. Bridge 250 forms the output as a voltage across load resistor 252 having a value of approximately 1–10 ohms. The voltage across resistor 252 is sensed by lines 222a, 222b through sensor circuit 222c to produce an output signal on line 222, as shown in FIG. 5. For the purposes of rectifying the values on lines 210, 212, the diodes 260, 262 allow negative current flow through resistor 252 and diodes 264, 266 allow positive current flow through the resistor. The difference between the current flows is the voltage between lines 222a, 222b. This voltage creates the output current signal in line 222. To create signals on lines 210, 212, the positive current pulses are sensed by primary winding 200 of $CT_1$. The positive pulse flow in the positive direction only by action of diode 270. In a like manner, diode 272 allows negative current pulses to flow from $CT_2$ according to the current pulses in lead 100B. Reset resistors 274, 276 have a high resistance, in the general range of 10 K ohms. The core of each current transformers is reset after a pulse is passed through diode 270, 272. These diodes prevent current flow in the opposite direction to isolate primary windings 200, 202 from output resistor 252. The operation of subtract combining circuit 220 as so far described is illustrated in the bottom graph of FIG. 6 where the transformer cores are reset between unidirectional pulses. In accordance with an aspect of the invention, circuit 220 includes reverse connected zener diodes 280,282 having a reverse voltage of about 3 volts. By using these two zener diodes, the voltage between lines 210, 212 will not cause current to flow in a current transformer unless there is corresponding current flowing in either windings 200, 202. This non-induced current cannot flow as long as the reverse voltage on zener diodes 280, 282 combine with the forward voltage drop on diodes 270, 272 is greater than the voltage across output resistor 252 and a set of diodes such as 260, 262 or 264, 266. Consequently, the use of zener diodes 280,282 eliminates the possibility of non-induced current. By using high resistances for reset resistors 274, 276, each of the current transformers is reset after it creates a current pulse. By using separate and distinct current transformers, it is possible to obtain this reset characteristic. When a single current transformer is used to create the "inner loop" current signal, as shown in FIG. 1 and FIG. 2, the transformers can not be reset after each pulse. This is an advantage of using the present invention and prevents any DC component build up by the current transformer. This characteristic is generally shown in FIG. 8 wherein the current transformers $CT_1$, $CT_2$ are reset between current pulses 210a, 212a.

Figure 9:
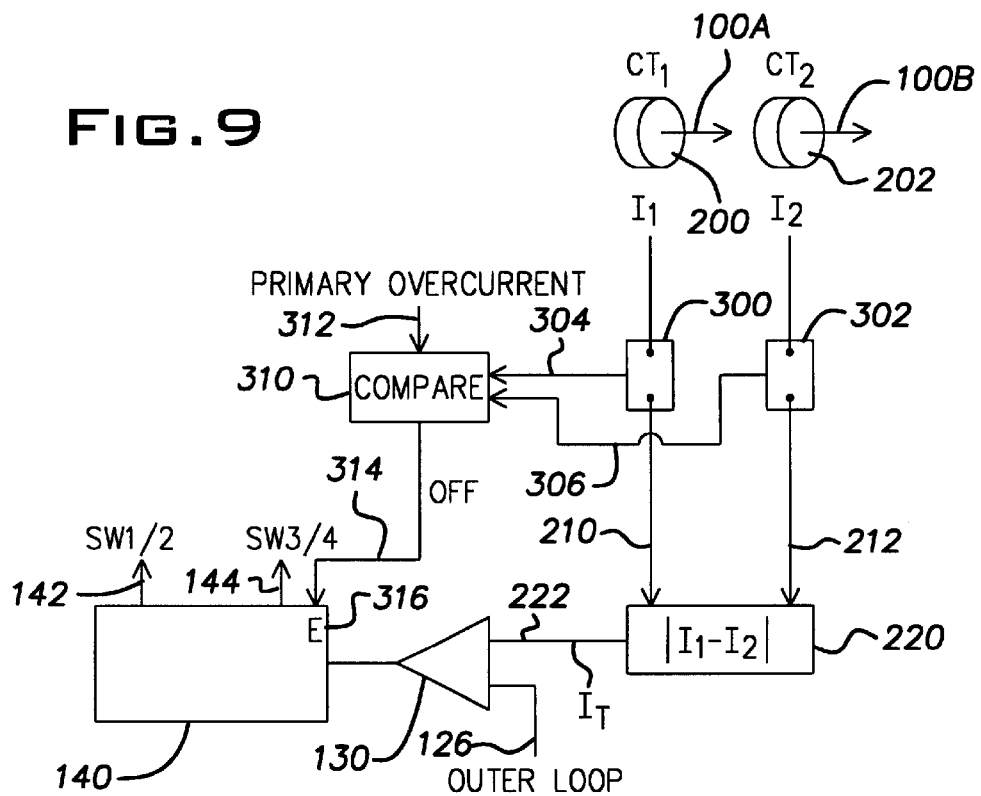
FIG. 9 is a combined wiring diagram and block diagram showing a further aspect of the present invention for controlling overcurrent.

In accordance with another aspect of the present invention, it is possible to incorporate an overcurrent protective circuit when two current transformers $CT_1$ and $CT_2$ are used as illustrated in FIG. 5. This aspect of the invention is illustrated in FIG. 9 wherein non-isolated current sensors, such as shunts 300, 302, sense currents on leads 100A and 100B, simultaneously. Signals representing these currents are directed to comparator 310 by lines 304, 306. When the currents on either of these lines exceeds the adjusted, preset primary overcurrent value on input or reference line 312, an output signal is created in line 314 for disabling enable terminal 316 of switch driver circuit 140. Consequently, a short in any of the switches SW1, SW2, SW3 or SW4 is sensed as the voltage level on lines 304,306. It is compared with the preset overcurrent value on line 312. In this manner, if a short occurs, the switches are disabled to prevent further damage to any component in the inverter or rectifier driving welder A.

Figure 10:
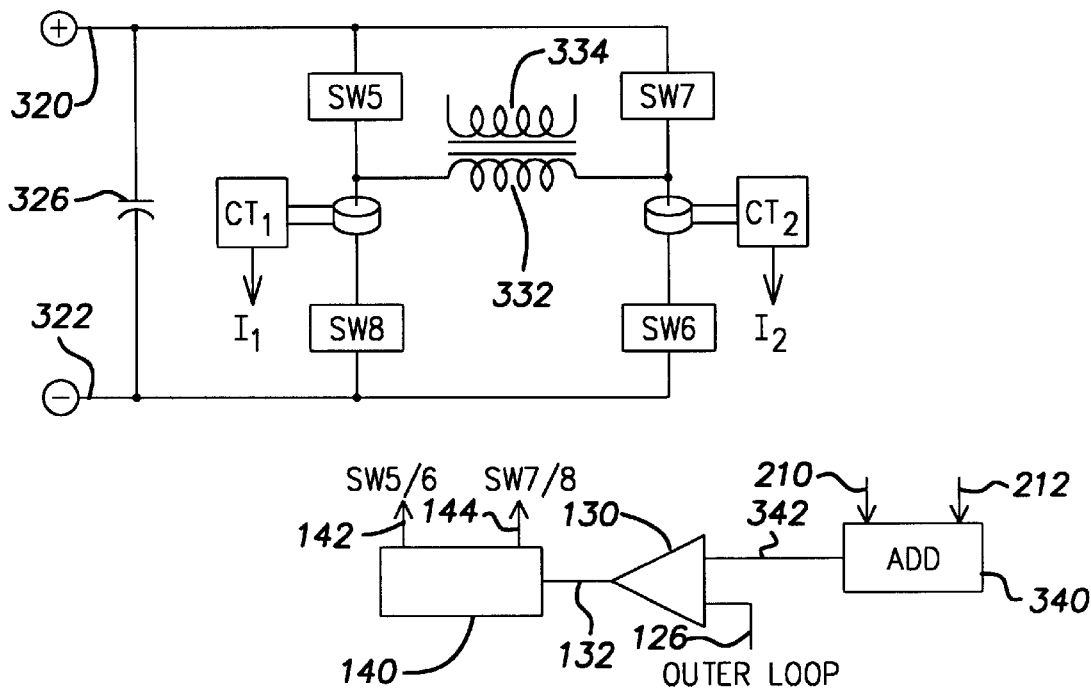
FIG. 10 is a wiring diagram of a full bridge inverter using an embodiment of the present invention.
Figure 11:
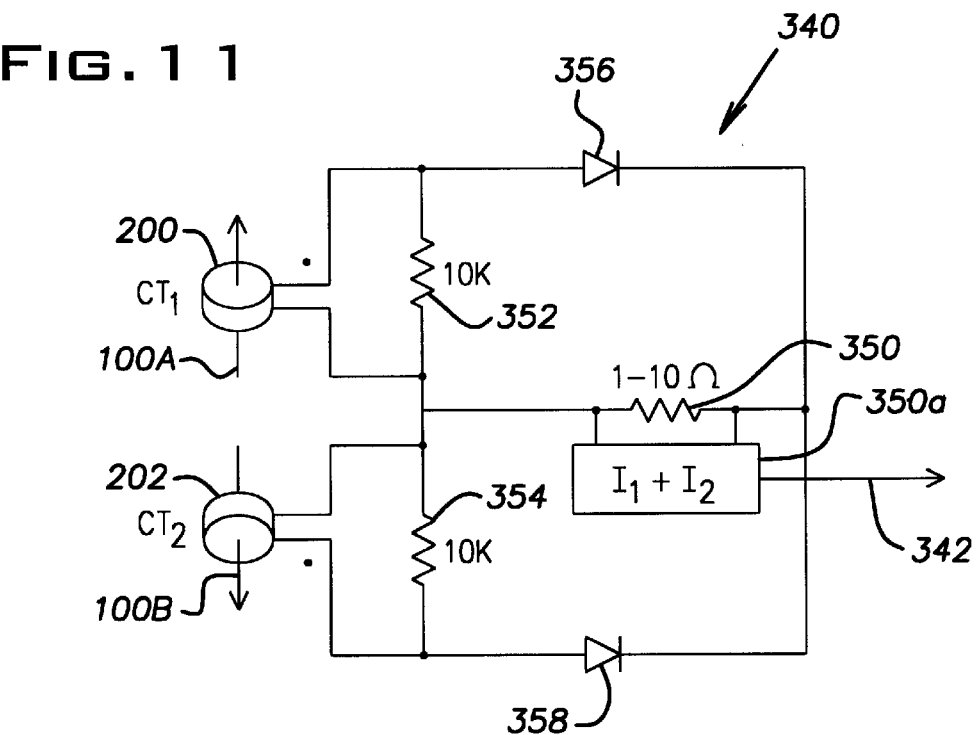
FIG. 11 is a wiring diagram of a combination circuit for adding the output signals of the separate and distinct current transformers shown in FIG. 10.

When the inverter topography is such that leads 100A, 100B do not conduct current simultaneously as in a push pull inverter, half bridge inverter or full bridge inverter, the outputs 210, 212 from current transformers $CT_1$, $CT_2$ can be conveniently added to provide the "inner loop" current signal. Such an arrangement is shown in FIGS. 10 and 11, wherein full bridge inverter B' includes a single DC link with a positive terminal 320 and a negative terminal 322 separated by a large input capacitor 326. Switches SW5, SW6 are closed to produce a positive pulse in transformer 330 and switches SW7 and SW8 are closed to produce a negative current pulse in the transformer. The transformer includes a primary winding 332 and a secondary winding 334, which secondary winding is used to provide the output power for the arc welder as shown in FIG. 1. By alternately closing the "switch" including switch pair SW5, SW6 and the "switch" including switch pair SW7, SW8, AC current pulses are directed through primary winding 332 to create an AC output current in secondary winding 334. Combining circuit 340 adds currents $I_1$, $I_2$ represented by the values on lines 210, 212, respectively. Adding circuit 340 is best shown in FIG. 11 and includes output 342 which is the current signal for the "inner loop" that is subsequently combined with the outer loop current signal on line 126 to produce the current control input on line 132. The control signal is directed to switch driver circuit 140 for reasons previously discussed. Circuit 340 includes output resistor 350 for controlling the output circuit 350a to create a current signal in line 342 as previously described. Reset resistors 352,354 reset current transformers $CT_1$, $CT_2$ after each current pulse. These reset resistors are quite large and act quickly. Output resistor 350 has a low resistance (about 1–10 ohms) so that diodes 356,358 isolate the primaries 200,202 from resistor 350 after each current pulse from the current transformers. Unlike subtract circuit 220, which requires an output bridge, there is no bridge necessary in an adding circuit, such as shown in FIG. 11.

Figure 12:
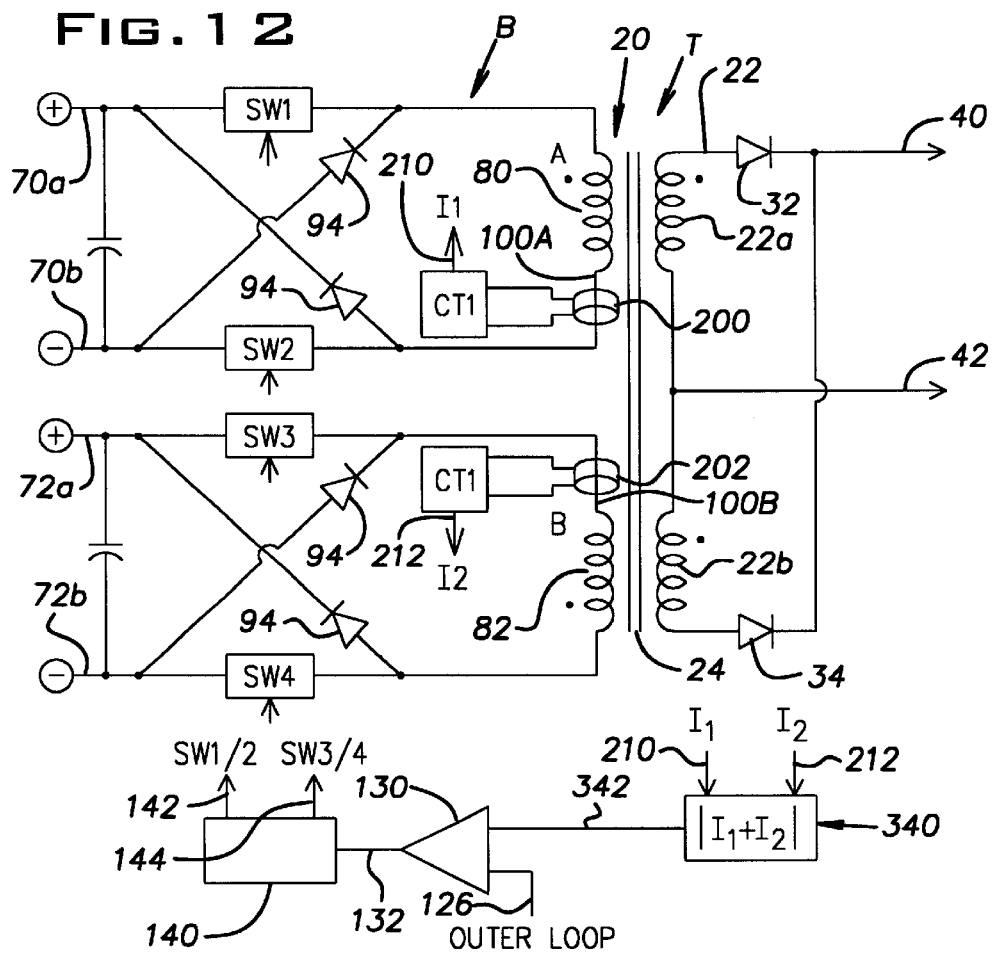
FIG. 12 is a wiring diagram of an inverter, similar to the inverter illustrated in FIG. 5, utilizing the preferred embodiment of the present invention with a combining circuit that adds the signals from the individual current transformers; and, FIG. 13 is a chart showing a number of current graphs similar to the graphs shown in FIG. 6 utilizing a combining circuit that adds the output signals in a manner obtained by use of the inverter shown in FIG. 12.
Figure 13:
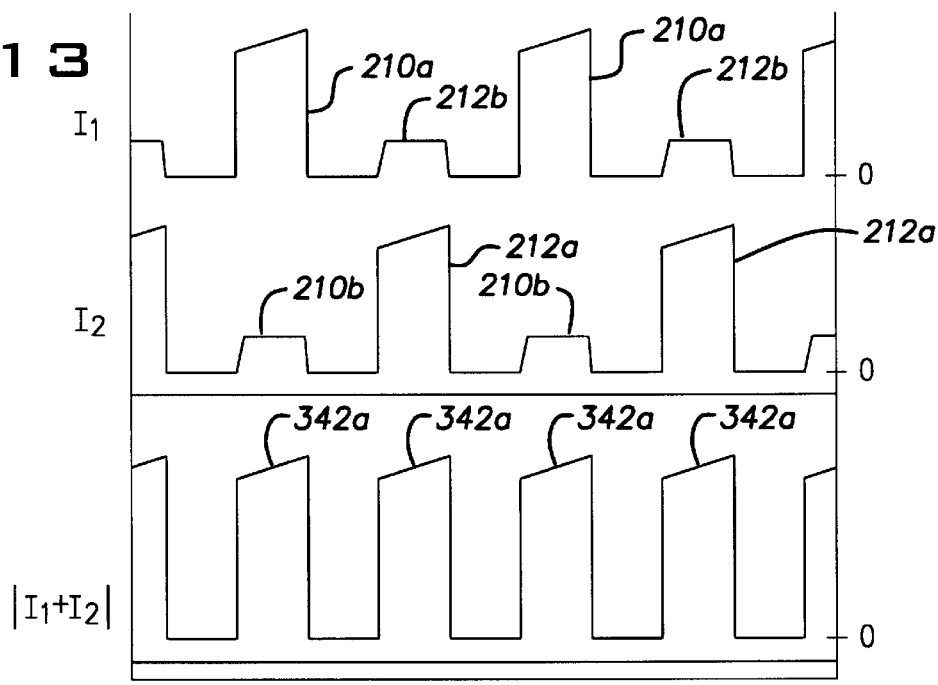

In accordance with another aspect of the present invention, the welder A in FIG. 5 is modified to include the summing circuit 340 shown in FIG. 11 instead of using subtract circuit 220 shown in FIG. 7. This modification of inverter B is illustrated in FIG. 12 wherein outputs 210, 212 are directed to an add circuit, as shown in FIG. 11, This circuit produces an absolute summation of currents $I_1$, $I_2$ in output 342. The current signal on line 342 is the "inner loop" current signal that is combined with the "outer loop" control current signal on line 126 to adjust the value of the current control input on line 132 for controlling switch driver circuit 140. Inverter B, as shown in FIG. 12, will produce circulating currents in one of the portions 80,82 when a pulse is created in the other portion of primary stage 20. This is illustrated in the upper two pulse graphs 20 shown in FIG. 13, which are the input currents to circuit 340, shown in FIG. 12. A pulse 210a in winding 80 produces a circulating pulse 210b in winding 82. Thus, current flows in leads 100A, 100B, simultaneously. By using a summing circuit, the circulating current is merely combined with the actual current signal created by a current pulse. This is shown in the bottom graph of FIG. 13 wherein pulses 342a are the summation of the current pulses on lines 210,212. Although the pulses on line 342 are not as pure as the pulse on line 222, they are still uniform and can be used advantageously as the "inner loop" feedback current signal. Each of the transformers $CT_1$, $CT_2$ are reset after each pulse; therefore, the DC component does not cause a shift as discussed with respect to FIGS. 3 and 4.

The present invention has been described with respect to several implementations in various embodiments. These implementations can be combined in various manners without departing from the intended spirit and scope of the invention as defined in the appended claims.

Having thus defined the invention, the following is claimed:

1. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer, said first and second switch each includes a plurality of series connected switches and said portions through which said first and second pulses pass are separate primary windings of said output transformer.

2. The improvement as defined in claim 1, wherein separate primary windings are mutually coupled.

3. The improvement as defined in claim 2, wherein said combining circuit subtracts said first and second output signals to produce a control current representing the total current in said first and second leads.

4. The improvement as defined in claim 3, wherein said combining circuit comprises an output resistor across which is generated said control current.

5. The improvement as defined in claim 4, wherein said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

6. The improvement as defined in claim 5, wherein said reset resistors have resistance values for resetting said current transformers when no forward current is flowing through said current transformers.

7. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer and said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

8. The improvement as defined in claim 7, wherein said reset resistors have resistance valuess for resetting said current transformers when no forward current is flowing through said current transformers.

9. The improvement as defined in claim 7, including a reverse blocking zener diode in series with each of said input circuits.

10. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer and said combining circuit subtracts said first and second output signals to produce a control current representing the total current in said first and second leads.

11. The improvement as defined in claim 10, wherein said combining circuit comprises an output resistor across which is generated said control current.

12. The improvement as defined in claim 10, wherein said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

13. The improvement as defined in claim 12, wherein said reset resistors have resistance values for resetting said current transformers when no forward current is flowing through said current transformers.

14. The improvement as defined in claim 12, wherein said first and second switch each includes a plurality of series connected switches.

15. The improvement as defined in claim 10, wherein said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

16. The improvement as defined in claim 15, wherein said reset resistors have resistance values for resetting said current transformers when no forward current is flowing through said current transformers.

17. The improvement as defined in claim 15, including a reverse blocking zener diode in series with each of said input circuits.

18. The improvement as defined in claims 10, wherein said first and second switch each includes a plurality of series connected switches.

19. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer, said combining circuit comprises an output resistor across which is generated said control current and said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

20. The improvement as defined in claim 19, wherein said reset resistors have resistance values for resetting said current transformers when no forward current is flowing through said current transformers.

21. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer and said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

22. The improvement as defined in claim 21, wherein said reset resistors have resistance values for resetting said current transformers when no forward current is flowing through said current transformers.

23. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer and said combining circuit adds said first and second output signals to produce a control current representative of the total current in said first and second leads.

24. The improvement as defined in claim 23, wherein said combining circuit comprises an output resistor across which is generated said control current.

25. The improvement as defined in claim 23, wherein said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

26. The improvement as defined in claim 25, wherein said reset resistors have resistance values for resetting said current transformers when no forward current is flowing through said current transformers.

27. The improvement as defined in claim 23, wherein said first and second switch each includes a plurality of series connected switches.

28. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer, and including a controller for changing the time said first switch and said second switch are closed to control the output current of said welder in response to the level on a current control input to said controller and a circuit for adjusting said level in response to the value of said current signal from said combining circuit.

29. The improvement as defined in claim 28, wherein said first and second switch each includes a plurality of series connected switches.

30. The improvement as defined in claim 28, wherein said portions through which said first and second pulses pass are separate primary windings of said output transformer.

31. The improvement as defined in claim 30, wherein said combining circuit subtracts said first and second output signals to produce a control current representing the total current in said first and second leads.

32. A current feedback device for creating a current signal indicative of the total current in the primary stage of the main transformer of a switching type inverter, which transformer has a primary stage coupled to a secondary stage and receiving a positive pulsing current flowing in a first lead and a negative pulsing current flowing in a second lead, said device comprising: a first current transformer surrounding said first lead to develop a first output signal controlled by said positive pulsing current, a second current transformer surrounding said second lead to develop a second output signal controlled by said negative pulsing current, a circuit for combining said first and second output signals to provide a current signal indicative of the total current in said primary stage of said main transformer and said combining circuit subtracts said first and second output signals to produce a control current representing the total current in said first and second leads.

33. The current feedback device as defined in claim 32, wherein said combining circuit comprises an output resistor across which is generated said control current.

34. A current feedback device for creating a current signal indicative of the total current in the primary stage of the main transformer of a switching type inverter, which transformer has a primary stage coupled to a secondary stage and receiving a positive pulsing current flowing in a first lead and a negative pulsing current flowing in a second lead, said device comprising: a first current transformer surrounding said first lead to develop a first output signal controlled by said positive pulsing current, a second current transformer surrounding said second lead to develop a second output signal controlled by said negative pulsing current, a circuit for combining said first and second output signals to provide a current signal indicative of the total current in said primary stage of said main transformer and said combining circuit includes a first input circuit with said first current transformer in series with a unidirectional device allowing current flow from said first current transformer and in parallel with a first reset resistor and a second input circuit with said second current transformer in series with a unidirectional device allowing current flow from said second current transformer and in parallel with a second reset resistor.

35. The current feedback device as defined in claim 34, wherein said reset resistors have resistance values for resetting said current transformers when no forward current is flowing through said current transformers.

36. A current feedback device as defined in claim 34, including a reverse blocking zener diode in series with said unidirectional device of each of said input circuits.

37. A current feedback device as defined in claim 36, including a controller for changing the total current in said primary stage in response to the level on a current control input and a circuit for adjusting said level by said current signal from said combining circuit.

38. A current feedback device for creating a current signal indicative of the total current in the primary stage of the main transformer of a switching type inverter, which transformer has a primary stage coupled to a secondary stage and receiving a positive pulsing current flowing in a first lead and a negative pulsing current flowing in a second lead, said device comprising: a first current transformer surrounding said first lead to develop a first output signal controlled by said positive pulsing current, a second current transformer surrounding said second lead to develop a second output signal controlled by said negative pulsing current, a circuit for combining said first and second output signals to provide a current signal indicative of the total current in said primary stage of said main transformer, and including a first current measurement unit in series with said first current transformer to read the current in said first lead and produce a first output signal representing said current, a second current measurement unit in series with said second current transformer to read the current in said second lead and produce a second output signal representing said current and a circuit for comparing said first and second output signals with an overcurrent signal to create an override signal when either of said output signals exceeds said overcurrent signal.

39. In an electric arc welder including a main transformer with a primary stage coupled to a secondary stage, in which is created an AC output current, a first switch opened and closed at a given rate to pass a series of first pulses of DC current in a first circuit having a first lead and through at least a portion of said primary stage in a first electrical direction, with each of said first pulses having a length determined by the time said first switch is closed, a second switch opened and closed at said given rate to pass a series of second pulses of DC current in a second circuit having a second lead through at a least a portion of said primary stage in a second electrical direction, with each of said second pulses having a length determined by the time said second switch is closed, and a control circuit for rapidly closing said first and second switches in sequence to induce said AC current in said output stage, the improvement comprising: a first current transformer surrounding said first lead of said first circuit to develop a first output signal controlled by said first pulses, a second current transformer surrounding said second lead of said second circuit and developing a second output signal controlled by said second pulses, a circuit for combining said first and second output signals to provide a current signal indicative of the total current in said primary stage of said main transformer and said portions through which said first and second pulses pass are separate primary windings of said output transformer.

* * * * *